(12) United States Patent
Maedako et al.

(10) Patent No.: US 10,541,538 B2
(45) Date of Patent: Jan. 21, 2020

(54) POWER GENERATOR SYSTEM

(71) Applicant: Honda Motor Co., Ltd., Tokyo (JP)

(72) Inventors: Minoru Maedako, Wako (JP); Tetsuya Matsuhisa, Wako (JP); Kenji Shibata, Wako (JP); Wataru Matsuyama, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 96 days.

(21) Appl. No.: 15/936,392

(22) Filed: Mar. 26, 2018

(65) Prior Publication Data
US 2018/0287393 A1    Oct. 4, 2018

(30) Foreign Application Priority Data
Mar. 30, 2017 (JP) .................................. 2017-066550

(51) Int. Cl.
| | |
|---|---|
| H02J 3/38 | (2006.01) |
| H02J 3/46 | (2006.01) |
| H02P 9/02 | (2006.01) |
| H02J 3/40 | (2006.01) |
| G01F 9/00 | (2006.01) |
| H02P 25/22 | (2006.01) |
| F02D 29/06 | (2006.01) |

(52) U.S. Cl.
CPC .............. H02J 3/46 (2013.01); G01F 9/008 (2013.01); H02J 3/40 (2013.01); H02P 9/02 (2013.01); H02P 25/22 (2013.01); F02D 29/06 (2013.01); F02D 2200/0625 (2013.01)

(58) Field of Classification Search
CPC ....... H02J 3/46; H02J 3/40; H02P 9/02; H02P 25/22; G01F 9/008; F02D 29/06; F02D 2200/0625
See application file for complete search history.

(56) References Cited

U.S. PATENT DOCUMENTS

| | | | |
|---|---|---|---|
| 8,793,041 B2* | 7/2014 | Yamamoto | B60W 20/13 701/22 |
| 9,266,525 B2* | 2/2016 | Sato | B60K 6/445 |
| 2009/0021198 A1* | 1/2009 | Okamura | B60L 50/16 318/400.3 |
| 2013/0151118 A1* | 6/2013 | Yamazaki | F02D 43/04 701/103 |
| 2016/0161318 A1* | 6/2016 | Pruzina | G01F 9/008 340/870.05 |

FOREIGN PATENT DOCUMENTS

JP          5839834 B2      1/2016

* cited by examiner

*Primary Examiner* — Jared Fureman
*Assistant Examiner* — Esayas G Yeshaw
(74) *Attorney, Agent, or Firm* — Duft & Bornsen, PC (57) ABSTRACT

A power generator system, including a remaining fuel detector detecting a remaining fuel amount of each of the first generator and the second generator, an operable time calculator calculating a remaining operable time of the each of the first generator and the second generator based on the remaining fuel amount detected by the remaining fuel detector, and a signal output unit outputting a control signal for adjusting outputs of the first generator and second generator to an actuator so that the remaining operable time of the first generator and the remaining operable time of the second generator calculated by the operable time calculator is equalized while keeping a total power of the first generator and the second generator constant.

8 Claims, 5 Drawing Sheets

POWER GENERATOR SYSTEM

CROSS-REFERENCE TO RELATED APPLICATION

This application is based upon and claims the benefit of priority from Japanese Patent Application No. 2017-066550 filed on Mar. 30, 2017, the content of which is incorporated herein by reference.

BACKGROUND OF THE INVENTION

Field of the Invention

This invention relates to a power generator system including a plurality of inverter generators which are connected in parallel.

Description of the Related Art

Equipment adapted to synchronously operate multiple inverter generators connected in parallel is known. In an arrangement taught by JP5839834B, for example, two inverter generators driven by engines are connected together through power lines and signal lines, and operation of the inverter generators is controlled to synchronize AC currents and voltages output from inverters of the pair of generators.

In the equipment set out in JP5839834B, however, the generators generate equal outputs during parallel operation and therefore consume equal amounts of fuel per unit time. From this it follows that when the generators have different amounts of remaining fuel, long-term parallel operation is difficult to achieve since one of the generators runs out of fuel and stops operating before the other.

SUMMARY OF THE INVENTION

An aspect of the present invention is a power generator system, including an inverter-type first generator and an inverter-type second generator mutually connected in parallel and mutually operated synchronously, the first generator and the second generator including engine and being driven by the engine respectively, a remaining fuel detector configured to detect a remaining fuel amount of each of the first generator and the second generator, an operable time calculator configured to calculate a remaining operable time of the each of the first generator and the second generator based on the remaining fuel amount detected by the remaining fuel detector, and a power adjuster configured to adjust a power of the each of the first generator and the second generator so as to equalize the remaining operable time of the first generator and the remaining operable time of the second generator calculated by the operable time calculator while keeping a total power of the first generator and the second generator constant.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
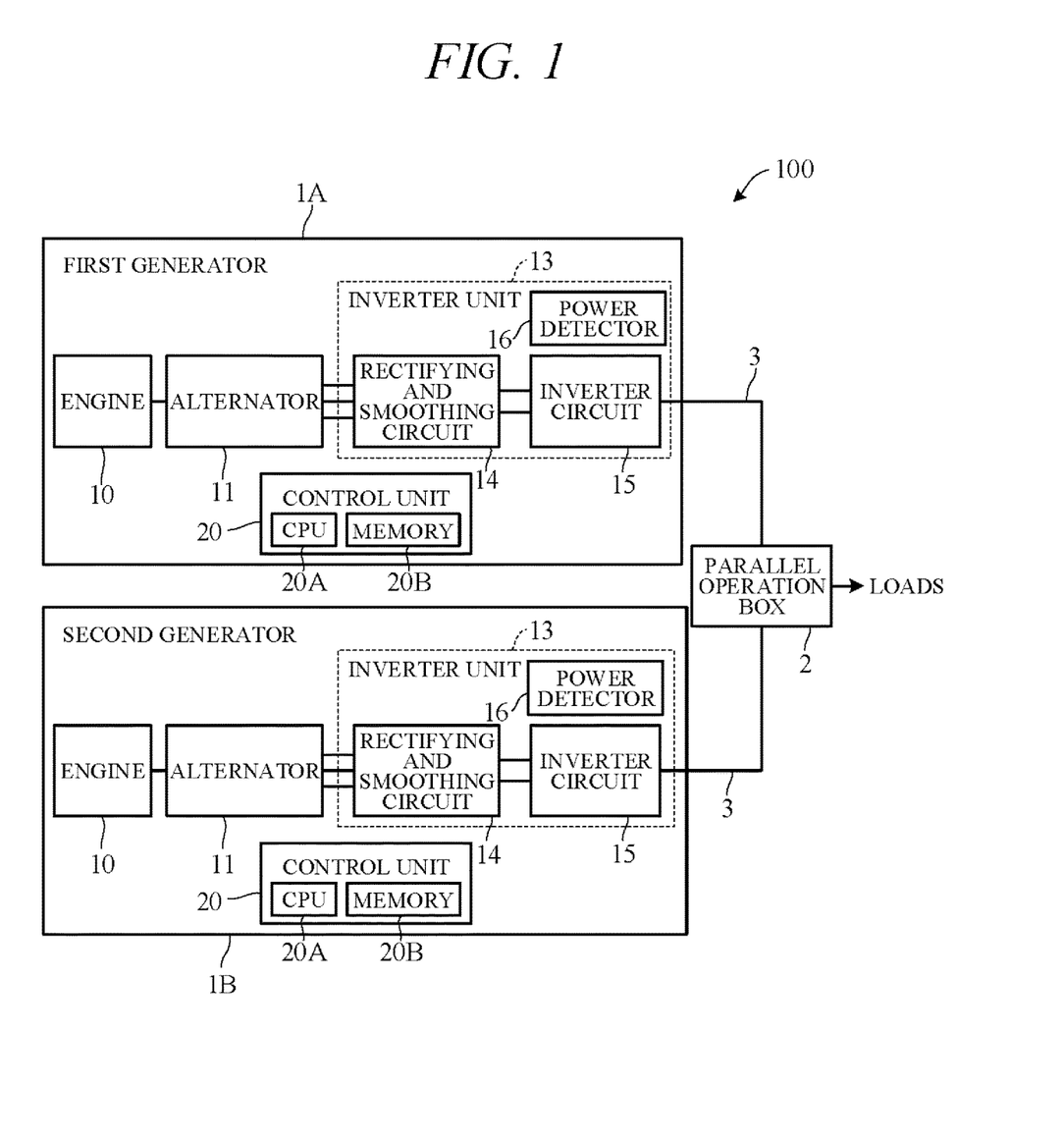
FIG. 1 is a diagram schematically illustrating an overall configuration of a power generator system according to an embodiment of the present invention.

An embodiment of the present invention is explained with reference to FIGS. 1 to 6 in the following. FIG. 1 is a diagram schematically illustrating the overall configuration of an electric power generator system 100 according to an embodiment of the present invention. This power generation system includes a first generator 1A, a second generator 1B, and a parallel operation box 2 that connects the first generator 1A and second generator 1B to enable parallel operation. The first generator 1A and second generator 1B are portable or mobile generators of weight and size a user can carry by hand. The power generator system 100 is not limited two interconnected generators but can instead include three or more interconnected generators.

The first generator 1A and second generator 1B are, for example, identical specification alternating current power generators (AC generators) having a rated voltage of 120V and identical structures. Specifically, as shown in FIG. 1, the generators 1A and 1B each includes a general purpose engine 10, an alternator 11 driven by the engine 10, an inverter unit 13 for converting and outputting electric power generated by the alternator 11 and a control unit 20. The generators 1A and 1B can be of a rated voltage other than 120V, such as 100V, for example.

The engine 10 is, for example, a spark ignition, air cooled, gasoline fueled engine with a piston that reciprocates inside a cylinder and a crankshaft (output shaft) that rotates synchronously with the piston. More specifically, a throttle valve and a fuel injector are provided in an air intake pipe of the engine 10, and an air-fuel mixture of air metered by the throttle and fuel ejected from the fuel injector is combusted in a combustion chamber to drive a piston and rotate a crankshaft through a connection rod. Power of the engine 10 is output to the alternator 11 through the crankshaft. The throttle valve and fuel injector are driven under control of control signals output from the control unit 20. An engine fueled by other than gasoline can be used. The engine can use a carburetor rather than a fuel injector to produce the air-fuel mixture. Engine speed is variably controlled in response to load.

The alternator (generator main unit) 11 is a multipolar alternator driven by the engine 10 to generate AC power. It includes a rotor connected to and rotated integrally with the crankshaft and a stator arranged concentric with the rotor to face a peripheral surface thereof. The rotor is provided with permanent magnets. The stator is provided with UVW windings arranged at phase angle differences of 120 degree. The alternator 11 can be driven as a starter motor by power from a battery (not shown), in which case the engine 10 can be started. The engine 10 can be started, for example, by operating an unshown recoil starter connected to the crankshaft.

The inverter unit 13 includes a rectifying and smoothing circuit 14 for rectifying and smoothing three-phase AC current output by the alternator 11, an inverter circuit 15 for converting DC current output from the rectifying and smoothing circuit 14 to AC current, and a power detector 16 for detecting voltage value and amperage value of AC current output from the inverter circuit 15. The power detector 16 includes a voltage sensor and an ampere sensor.

The rectifying and smoothing circuit 14 includes rectifying circuits and capacitor or other type smoothing circuits associated one with each of the U-phase, V-phase and W-phase windings of the alternator 11. The rectifying and smoothing circuit 14 is configured as MOSFET, IGBT or other transistors, and includes three pairs of (a total of six) semiconductor switching elements connected to respective U-phase, V-phase and W-phase windings of the alternator 11 and diodes connected in parallel with the switching elements. The switching elements are turned ON and OFF by control signals output by the control unit 20. Therefore, when the alternator 11 functions as a generator, three-phase AC output from the alternator 11 is rectified, and when the alternator 11 functions as a starter motor, DC supplied from the battery is converted to three-phase AC and supplied to the alternator 11. Optionally, the engine 10 can be started using the battery and a starter motor, for example, rather than by using a three-phase bridge circuit having FETs or IGBTs as a motor driver. The circuit can therefore be configured as a three-phase hybrid bridge circuit using thyristors and diodes instead of as a three-phase bridge circuit with FETs or IGBTs.

The inverter circuit 15 is configured as an H-bridge circuit, for example, and includes two pairs of (a total of four) semiconductor switching elements using MOSFET, IGBT or other transistors, and diodes connected in parallel with the switching elements. The switching elements are turned ON and OFF by control signals output by the control unit 20 so as to convert DC current to single-phase AC current. The obtained AC current is sinusoidally modulated by passage through an unshown filter circuit that is part of the inverter circuit 15 and transmitted through a cable 3 to the parallel operation box 2.

The cables 3 include power lines for passing current output from the generators 1A and 1B and communication lines for enabling intercommunication between the control unit 20 of the first generator 1A and the control unit 20 of the second generator 1B. The parallel operation box 2 forms an electrical circuit for interconnecting the generators 1A and 1B connected thereto in parallel. Sockets are provided in the parallel operation box 2 and electrical loads are connected to the sockets. During parallel operation, a double power (double current) that when the generator 1A or 1B is operated alone can be obtained.

During parallel operation, the voltage waveforms of the outputs from the generators 1A and 1B must be made coincident in amplitude, phase and frequency. In other words, the generators 1A and B must be synchronized. For this, the generator that starts first is designated master and the one that starts later is designated slave, and parallel operation is performed by controlling switching operation of the inverter circuit 15 of the slave generator to synchronize output of the slave generator with output of the master generator.

Specifically, when the second generator 1B (slave generator) starts after the first generator 1A (master generator) starts, voltage of the first generator 1A applied through the power line is detected by the power detector 16 of the second generator 1B, and the control unit 20 of the second generator 1B controls switching operation of the inverter circuit 15 based on the detected value. Once in parallel operation, electric current data, voltage data and other such data of the generators 1A and 1B detected by the power detectors 16 of the generators 1A and 1B are exchanged between the control units 20 of the generators 1A and 1B through the signal line. As a result, current unbalance and/or cross-current can be inhibited by controlling switching elements of the inverter circuits 15 so as to correct voltage amplitude and voltage phase.

With the so-configured power generator system 100, when the remaining fuel amounts of the generators 1A and 1B differ and their power outputs are the same, the generators cannot easily continue parallel operation for a long time since one of them runs out of fuel and stops operating before the other. Therefore, in the present embodiment, the power generator system 100 is configured as described below so as to enable long-term parallel operation by ensuring that the multiple generators 1A and 1B run out of fuel at the same time.

Figure 2:
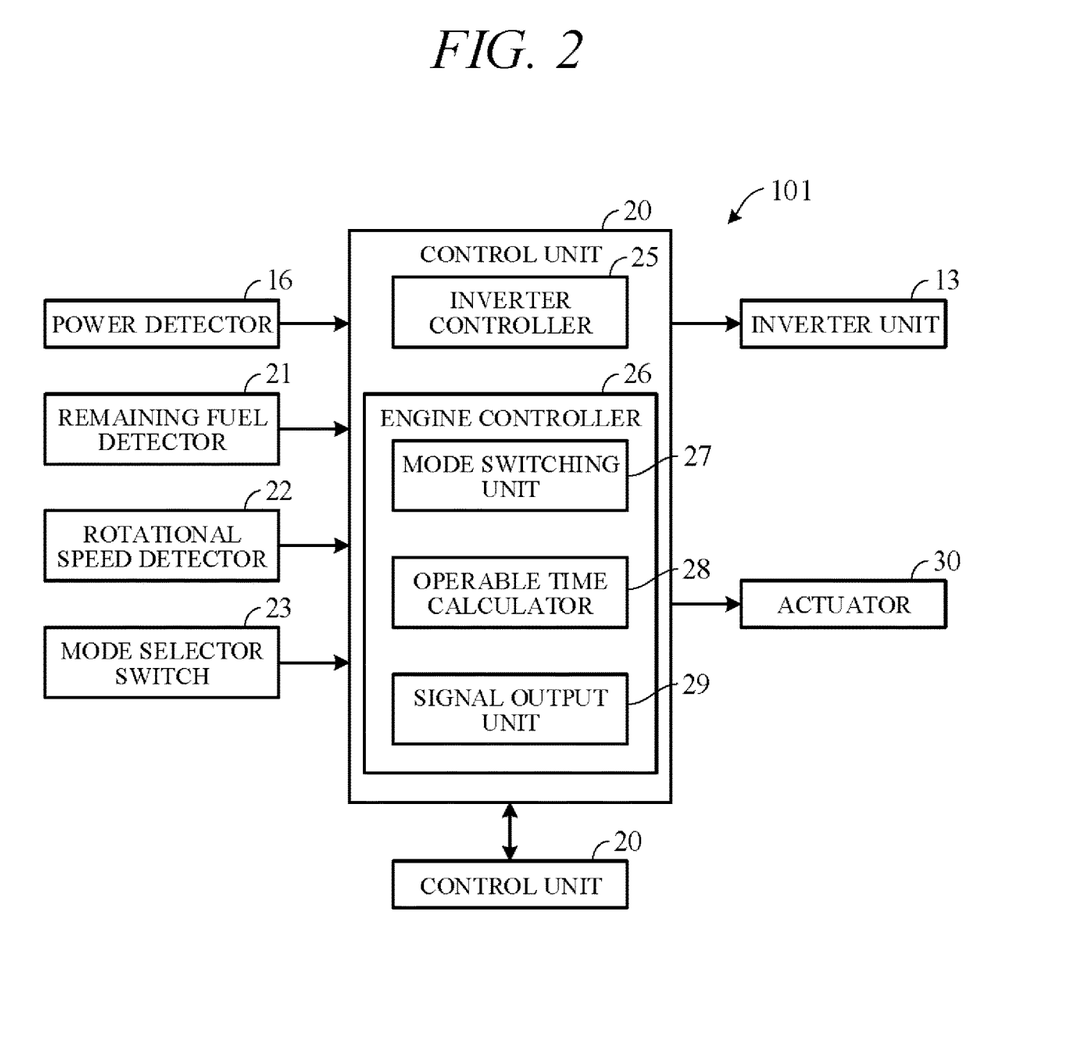
FIG. 2 is a block diagram showing a configuration of control apparatus constituting a power generator system according to an embodiment of the present invention.

FIG. 2 is a block diagram showing essential components of the power generator system 100 according to this embodiment of the present invention, particularly configuration of control apparatuses 101 for controlling the generators 1A and 1B. The control apparatuses 101 of the generators 1A and 1B are identically configured, and FIG. 2 shows the configuration of the control apparatus 101 of only one generator (subject generator) and illustration of the control apparatus of the other generator (partner generator) is omitted.

As shown in FIG. 2, the control unit 20 receives signal inputs from the power detector 16, a remaining fuel detector 21, a rotational speed detector 22, and a mode selector switch 23.

As stated above, the power detector 16 is configured to include a current sensor for detecting current passing through the loads and a voltage sensor for detecting applied voltage, and by performing predetermined calculations using values detected by these sensors, amount of power output to the loads (generated power value) can be calculated in the control unit 20. The remaining fuel detector 21 is a detector for detecting a remaining fuel amount in a gasoline tank, configured, for example, as a float-type detector that detects the height of a float floatingly provided in the gasoline tank.

The rotational speed detector 22 is configured as an electromagnetic pick-up type or an optical type crank angle sensor, for example, and engine speed can be detected from signals produced by the rotational speed detector 22. The mode selector switch 23 is a switch operated by the user to instruct switching from normal operating mode to prolonged operation mode. In normal operating mode, the generators 1A and 1B operate in parallel at equal load-sharing rates (1:1 load sharing), and in prolonged operation mode, load sharing by the generators 1A and 1B is changed so that the generators run out of fuel at the same time.

As shown in FIG. 1, the control unit 20 is a microcomputer configured to include an arithmetic processing unit including a CPU 20A, ROM, RAM and the like memory 20B, and additional peripheral circuits. As shown in FIG. 2, the control unit 20 includes an inverter controller 25 and an engine controller 26 as functional constitution. Optionally, the controllers 25 and 26 can be provided as discrete controllers.

The inverter controller 25 outputs control signals to the inverter unit 13 based on signals from the power detector 16 and signals transmitted from the other control unit 20 through the signal line, thereby ON-OFF controlling switching elements of the rectifying and smoothing circuit 14 and the switching elements of the inverter circuit 15.

The engine controller 26 includes a mode switching unit 27, an operable time calculator 28, and a signal output unit 29. The mode switching unit 27 responds to an instruction from the mode selector switch 23 by switching operating mode from normal operating mode to prolonged operation mode.

When prolonged operation mode is active, the operable time calculator 28 uses remaining fuel amount (remaining fuel data) detected by the remaining fuel detector 21 and load value detected by the power detector 16 to calculate a remaining operable time of the subject generator under continued operation at current load, i.e. to calculate operable time up to fuel exhaustion.

The signal output unit 29 defines current-voltage characteristics and outputs control signals to an actuator 30 for controlling drive power of the engine 10 so as to operate the subject generator based on the defined characteristics, i.e., so as vary current and voltage along the characteristics. The actuator 30 is, for example a throttle motor for adjusting throttle valve opening. In addition to outputting the control signals to the actuator 30, the signal output unit 29 calculates fuel injection quantity suitable for the throttle opening in accordance with a predefined fuel injection quantity map and also outputs control signals to the injector so as to eject the calculated amount of fuel from the injector.

Figure 3:
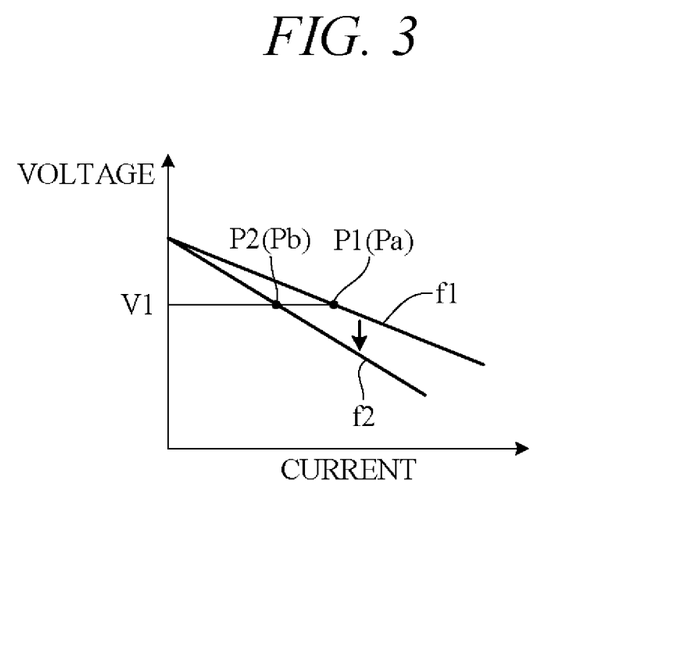
FIG. 3 is a diagrammatic overview of an example of the current-voltage characteristics of a generator.

FIG. 3 is a diagrammatic overview of an example of the current-voltage characteristics. Voltage drop characteristics f1 and f2 representing decreasing voltage with increasing output current are shown in FIG. 3. The characteristic f1 represents an example of voltage drop characteristics of the generators 1A and 1B. Point P1 on characteristic f1 is an operating point corresponding to electrical loads under rated voltage V1 in normal operating mode, and power value of the subject generator is Pa at operating point.

Figure 4:
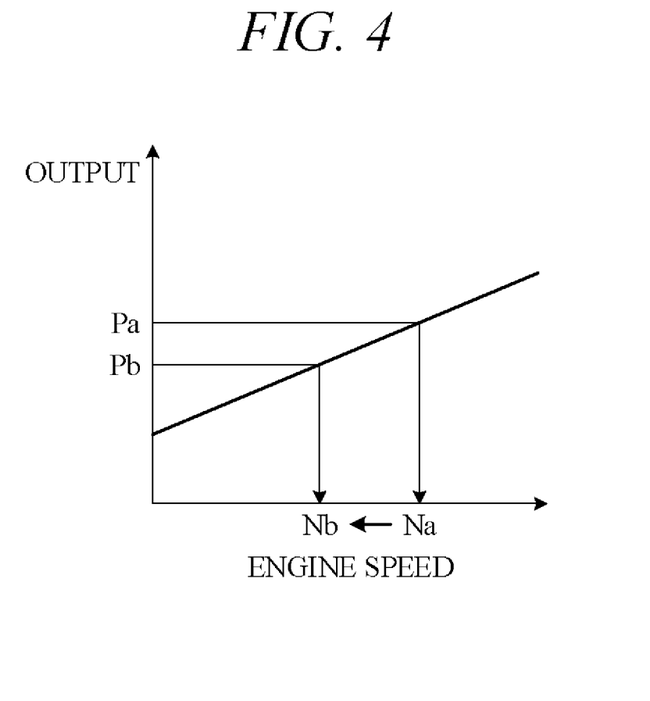
FIG. 4 is a diagram showing a relationship between engine speed of the engine driving a generator and a power value.

FIG. 4 is a diagram showing an example of how output (generated power value) varies with predefined engine speed of the generators 1A and 1B. As shown in FIG. 4, a relationship is defined between engine speed and output whereby engine speed increases with increasing output, and engine speed corresponding to power value Pa in FIG. 3 is Na. Therefore, once the operating point (operating point corresponding to electrical loads) on the voltage drop characteristic is determined, desired engine speed Na is determined, and the signal output unit 29 outputs control signals to the actuator 30 to make engine speed detected by the rotational speed detector 22 equal to desired engine speed Na.

When prolonged operation mode is active, the signal output unit 29 determines which between remaining operable time of the subject generator calculated by the operable time calculator 28 and remaining operable time of the partner generator transmitted from the control unit 20 of the partner generator is longer/shorter. When remaining operable time of the subject generator is shorter than remaining operable time of the partner generator, the signal output unit 29 shifts the voltage drop characteristic of the subject generator toward lower power from that of the characteristic f1, as indicated by characteristic f2 of FIG. 3, for example. The operating point of the subject generator is therefore shifted to P2, whereby power to be output by the subject generator decreases from Pa to Pb. As shown in FIG. 4, desired engine speed therefore decreases from Na to Nb, whereby fuel consumption of the subject generator per unit time can be decreased.

In such a case, the signal output unit 29 alters the voltage drop characteristic in accordance with difference between subject generator remaining operable time and partner generator remaining operable time. Specifically, it shifts the voltage drop characteristic further toward the low power side in proportion as the difference between the generator remaining operable times is greater. The generated power value (output current value) of the partner generator is concurrently increased to meet the fixed electrical loads on the power generator system as a whole, so that fuel consumption per unit time of the partner generator increases. The result of this is that load sharing rate (current output balance) between the subject generator and partner generator is altered while keeping total generated power of the subject generator and partner generator constant at a predetermined value.

Such load sharing rate change is performed at a time when the generators 1A and 1B have an output capacity margin. For example, if load sharing rate is altered when the generators 1A and 1B are operating in parallel at maximum capacity, total output of the generators 1A and 1B is apt to decrease and make supply of the predetermined power to the electrical loads impossible. Therefore, when power value detected by the power detector 16 during parallel operation is equal to or greater than a predetermined value (e.g., maximum power value), the signal output unit 29 does not alter the voltage drop characteristic.

Figure 5:
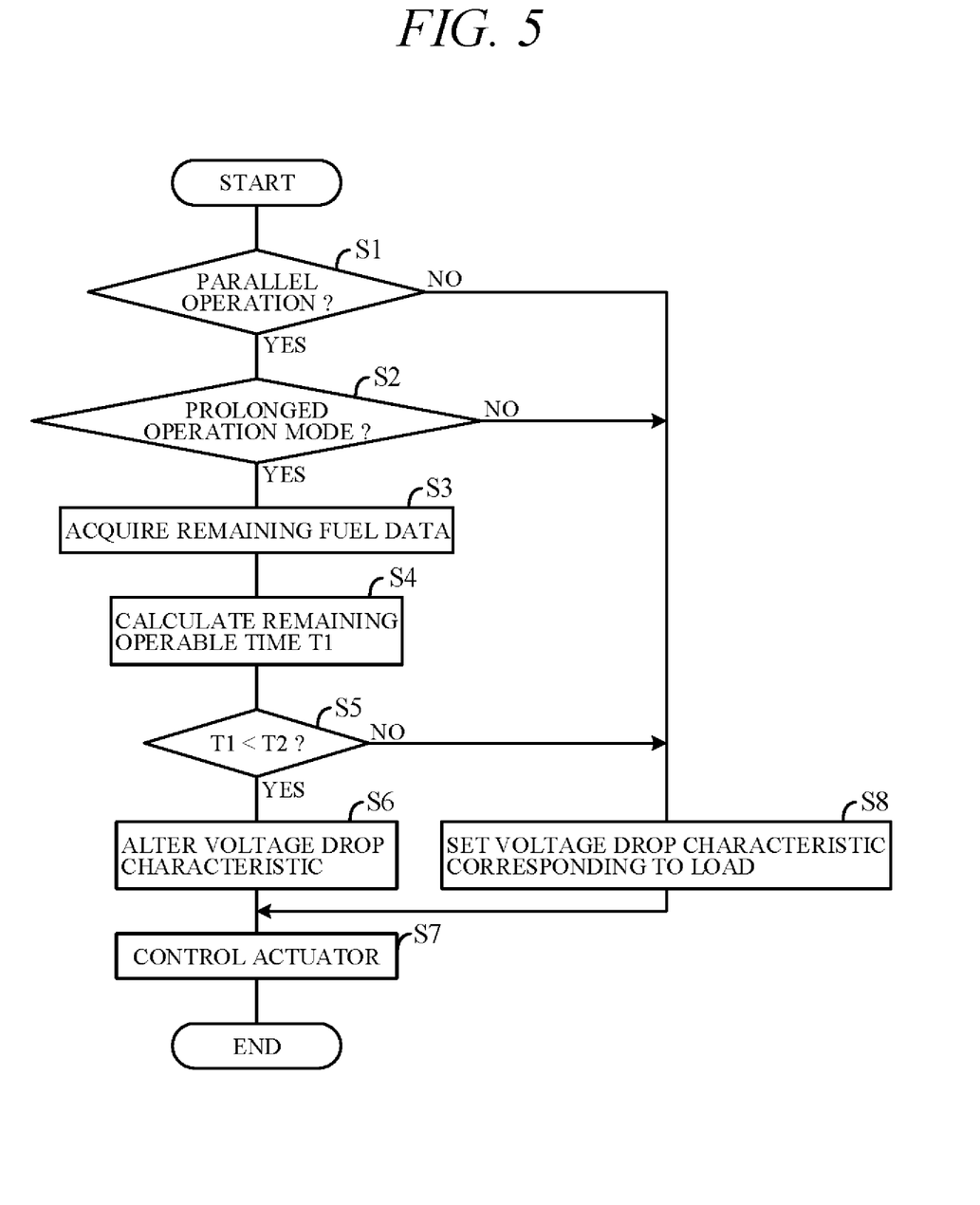
FIG. 5 is a time chart showing an example of process performed by the engine controller of FIG. 2.

FIG. 5 is a flowchart showing an example of processing performed by the CPU 20A (particularly by the engine controller 26) in accordance with a program loaded in the memory 20B in advance. The processing according to this flowchart is performed in the engine controller 26 of the subject generator (e.g., first generator 1A). Processing performed in the engine controller 26 of the partner generator (e.g., second generator 1B) is the same as that shown in FIG. 5. The processing indicated by the flowchart of FIG. 5 starts when the subject generator starts to generate power upon commencing operation and is repeated at predetermined intervals.

First, in S1 (S: processing Step), whether the generators are operating in parallel is determined by exchanging data detected by the power detectors 16 with the partner generator. When the result in S1 is YES, the program goes to S2. In S2, whether switching to prolonged operation mode is instructed is determined by referring to a signal from the mode selector switch 23. When the result in S2 is YES, the program goes to S3 to acquire remaining fuel data detected by the remaining fuel detector 21.

Next, in S4, the remaining fuel data and the power value detected by the power detector 16 are used to calculate subject generator remaining operable time T1 under continued operation at current power value. Next, in S5, partner generator remaining operable time T2 is acquired through the signal line, and whether subject remaining operable time T1 is shorter than partner generator remaining operable time T2 is determined. When the result in S5 is YES, the program goes to S6.

In S6, the voltage drop characteristic is altered in accordance with difference between the remaining operable times T1 and T2. For example, the voltage drop characteristic f1 in FIG. 3 is shifted to f2. Next, in S7, a control signal is output to the actuator 30 to control engine speed so as to move the operating point (indicating current/voltage relationship) from P1 to P2 on the shifted characteristic f2 in FIG. 3. Since this lowers output of the subject generator, the fuel consumption per unit time decreases. Concomitantly, the partner generator output rises and the fuel consumption per unit time increases.

When the result in any of S1, S2 and S5 is NO, the program goes to S8. In S8, a load-matched voltage drop characteristic of the subject generator (e.g., characteristic f1) is set so as to equalize the load sharing rates of the subject generator and the partner generator. Next, in S7, a control signal is output to the actuator 30 to control engine speed so as to move the operating point indicating current/voltage relationship to a position on characteristic f1 (to P1 in FIG. 3).

An issue here is that altering the voltage drop characteristic at regular intervals is apt to cause control hunting that repeatedly raises and lowers subject and partner generator output. Optionally, therefore, more stable control operation can be achieved by maintaining the voltage drop characteristic after each alteration until a predetermined time is determined to have passed. Alternatively, stably controlled operation can be realized by defining another control gain or the like.

Figure 6:
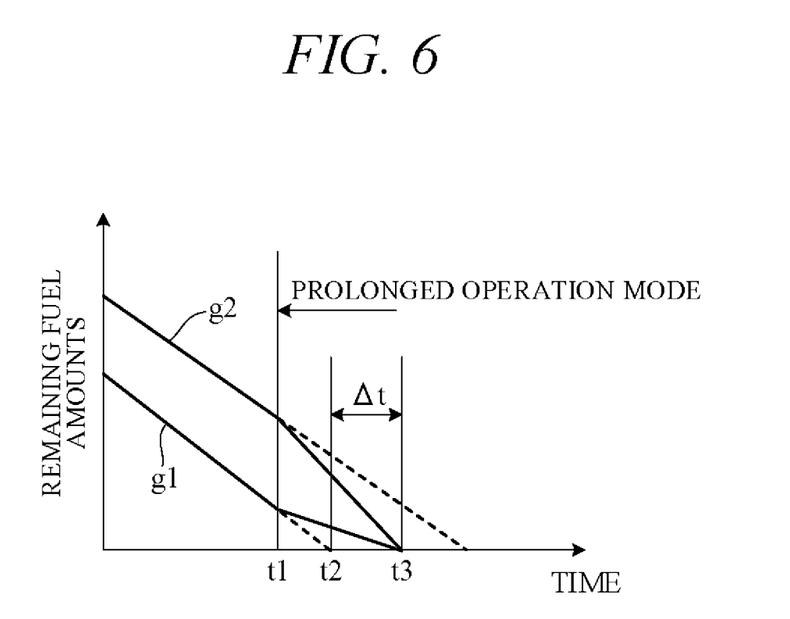
FIG. 6 is a time chart showing an example of operation of the power generator system according to the embodiment of the present invention

FIG. 6 is a time chart showing an example of operation of the power generator system according to an embodiment of the present invention. In this diagram, characteristic g1 represents subject generator remaining fuel amount characteristic, and characteristic g2 represents partner generator remaining fuel amount characteristic. In this example, as shown in FIG. 6, remaining fuel amount of the subject generator is initially less than remaining fuel amount of the partner generator. When operation is switched to prolonged operation mode by an instruction from the mode selector switch 23 at time t1, the voltage drop characteristic of the subject generator is, for example, shifted from f1 to f2 in FIG. 3 (S6).

This decreases output current value of the subject generator and increases output current value of the partner generator by the amount of this decrease. Therefore, only the current output balance changes and the power generator system as a whole can continue to generate a constant output with respect to the load. As a result, subject generator engine speed falls, whereby fuel consumption per unit time of the subject generator decreases following time t1 as indicated by characteristic g1, while fuel consumption per unit time of the partner generator increases following time t1 as indicated by characteristic g2. As a consequence, the subject generator and the partner generator run out of fuel simultaneously at time t3, and duration of parallel operation can be extended to longer than in normal operating mode. Specifically, in normal operating mode the subject generator runs out of fuel and parallel operation stops at time t2, but in prolonged operation mode parallel operation can be extended by time $\Delta t$.

The present embodiment can achieve advantages and effects such as the following:

(1) The power generator system 100 is equipped with the inverter-type first generator 1A (subject generator) and the inverter-type second generator 1B (partner generator) driven by the engines 10 and mutually operated synchronously in parallel (FIG. 1). This power generator system 100 includes the remaining fuel detector 21 for detecting remaining fuel amounts of the first generator 1A and the second generator 1B, the operable time calculators 28 for calculating remaining operable times of the first generator 1A and the second generator 1B based on the remaining fuel amounts detected by the remaining fuel detector 21, and the signal output unit 29 for outputting control signals to the actuator 30 so as to equalize the remaining operable time T1 of the first generator 1A and the remaining operable time T2 of the second generator 1B calculated by the operable time calculators 28 while keeping total power of the first generator 1A and second generator 1B constant (FIG. 2).

Owing to this configuration, the outputs (load sharing rates) of the first generator 1A and the second generator 1B can be adjusted so that the first generator 1A and the second generator 1B continue to supply predetermined power to the electrical load until they simultaneously run out of fuel. As a result, parallel operating time can be extended relative to that when the generators generate equal outputs.

(2) The signal output unit 29 controls the associated engine 10 (actuator 30) based on a voltage drop characteristic representing relationship between current and voltage output from the first generator 1A or second generator 1B, and alters the voltage drop characteristic when the remaining operable time T1 of the first generator 1A calculated by the associated operable time calculator 28 is shorter than the remaining operable time T2 of the second generator 1B calculated by the associated operable time calculator 28 (FIG. 3). By shifting the voltage drop characteristic in this manner, current output balance (load sharing rate) can be suitably adjusted while continuing to perform parallel operation at a constant predetermined voltage.

(3) The mode switching unit 27 is additionally incorporated for switching operating mode from normal operating mode, in which processing performed by the signal output units 29 is incapable of adjusting power values of the first generator 1A and second generator 1B, to prolonged operation mode in which the output adjust capability is enabled (FIG. 2). As a result, parallel operation in which the outputs of the generators 1A and 1B are constantly maintained equal can be performed without altering load sharing rate. Noise can therefore be reduced because maximum speed of the engines 10 can be suppressed.

In the aforesaid embodiment, the voltage drop characteristic is shifted toward low load side when remaining operable time T1 of the first generator 1A is shorter than remaining operable time T2 of the second generator 1B, but, alternatively, the voltage drop characteristic can be shifted toward high load side when remaining operable time T1 of the first generator 1A is longer than remaining operable time T2 of the second generator 1B. In other words, the signal output unit 29 concerned can be adapted to alter (shift) the voltage drop characteristic when remaining operable time differs between the first generator 1A and the second generator 1B. When noise (such as beat noise) occurs owing to change in generators 1A, 1B engine speed caused by altering the voltage drop characteristics, output (engine speed) of the generators 1A and 1B can be set so as to avoid such noise.

In the aforesaid embodiment, the signal output unit 29 outputs control signals to the actuator 30 for controlling engine drive power in order to adjust engine speed so as to equalize remaining operable time T1 of the first generator 1A and the remaining operable time T2 of the second generator 1B calculated by the operable time calculator 28, but the output adjust units for adjusting outputs of the first generator 1A and the second generator 1B are not limited to this configuration. In the aforesaid embodiment, the remaining fuel amounts of the first generator 1A and the second generator 1B are detected by the remaining fuel detector 21 of, for example, float type, but the remaining fuel detecting units are not limited to this configuration. In the aforesaid embodiment, the mode switching unit 27 is adapted to switch from normal operating mode (first mode) to prolonged operation mode (second mode) in response to operation of the mode selector switch 23, but, alternatively, operating mode can be switched automatically, rather than by switch operation, when a predetermined condition is met.

In the aforesaid embodiment, the first generator 1A and the second generator 1B are electrically connected through the parallel operation box 2, but it is alternatively possible to install a socket of a capacity enabling parallel output in one of the generators, in which case the parallel operation box can be omitted.

The above embodiment can be combined as desired with one or more of the above modifications. The modifications can also be combined with one another.

In accordance with the present invention, the remaining operable times of a first generator and a second generator can be equalized to enable long-term parallel operation even when the remaining fuel amounts of the generators are different.

Above, while the present invention has been described with reference to the preferred embodiments thereof, it will be understood, by those skilled in the art, that various changes and modifications may be made thereto without departing from the scope of the appended claims.

What is claimed is:

1. A power generator system comprising:
    an inverter-type first generator and an inverter-type second generator mutually connected in parallel and mutually operated synchronously, the first generator and the second generator including an engine and being driven by the engine respectively;
    a remaining fuel detector configured to detect a remaining fuel amount of each of the first generator and the second generator;
    an operable time calculator configured to calculate a remaining operable time of the each of the first generator and the second generator based on the remaining fuel amount detected by the remaining fuel detector; and
    a power adjuster configured to adjust a power of each of the first generator and the second generator so as to equalize the remaining operable time of the first generator and the remaining operable time of the second generator calculated by the operable time calculator while keeping a total power of the first generator and the second generator constant.

2. The power generator system according to claim 1, wherein
    the power adjuster is configured to control the engine based on a voltage drop characteristic representing a relationship between a current and a voltage output from each of the first generator and the second generator, and to alter the voltage drop characteristic when the remaining operable time of the first generator and the remaining operable time of the second generator calculated by the operable time calculator differ with each other.

3. The power generator system according to claim 2, wherein
    the power adjuster is configured to shift the voltage drop characteristic toward a lower power side when the remaining operable time of the first generator calculated by the operable time calculator is shorter than the remaining operable time of the second generator calculated by the operable time calculator.

4. The power generator system according to claim 3, wherein
    the power adjuster is configured to increase a shift amount of the voltage drop characteristic toward a lower power side as the remaining operable time of the first generator calculated by the operable time calculator is shorter than the remaining operable time of the second generator calculated by the operable time calculator and the difference between the remaining operable time of the first generator and the second generator is greater.

5. The power generator system according to claim 2, further comprising
    a power detector configured to detect a power value generated by each of the first generator and the second generator, wherein
    the power adjuster is configured not to alter the voltage drop characteristic when the power value detected by the power detector is equal to or greater than a predetermined value if the remaining operable time of the first generator and the remaining operable time of the second generator calculated by the operable time calculator differ with each other.

6. The power generator system according to claim 2, wherein,
    the power adjuster is configured to maintain an altered voltage drop characteristic until a predetermined time passes after the voltage drop characteristic is altered.

7. The power generator system according to claim 1, further comprising a mode switching unit configured to switch operating mode from a first mode in which a processing of adjusting of each of the first generator and the second generator performed by the power adjuster is disabled to a second mode in which a processing of adjusting of each of the first generator and the second generator performed by the power adjuster is enabled.

8. A power generator system comprising:
    an inverter-type first generator and an inverter-type second generator mutually connected in parallel and mutually operated synchronously, the first generator and the second generator including an engine and being driven by the engine respectively;
    a remaining fuel detector configured to detect a remaining fuel amount of each of the first generator and the second generator; and
    a CPU and a memory coupled to the CPU,
    wherein the CPU and the memory are further configured to perform
    calculating a remaining operable time of each of the first generator and the second generator based on the remaining fuel amount detected by the remaining fuel detector; and
    adjusting a power of each of the first generator and the second generator so as to equalize the remaining operable time of the first generator and the remaining operable time of the second generator while keeping total power of the first generator and the second generator constant.

* * * * *